May 8, 1934.          D. PYZEL          1,957,849
PROCESS AND APPARATUS FOR THE PRODUCTION OF AMMONIA
Filed Feb. 9, 1932
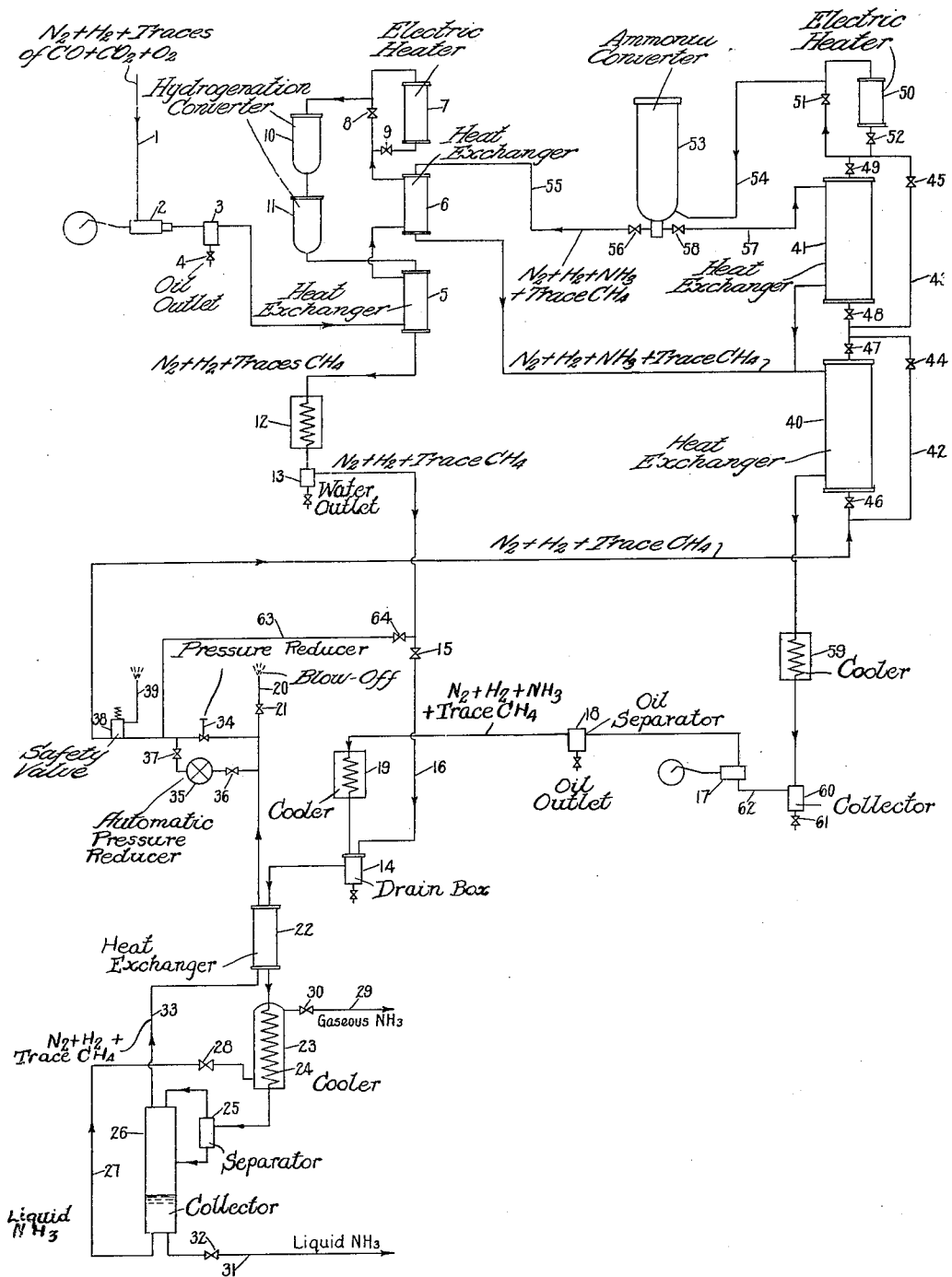
Inventor :- Daniel Pyzel.
By His Attorney :-

Patented May 8, 1934

1,957,849

UNITED STATES PATENT OFFICE 1,957,849

PROCESS AND APPARATUS FOR THE PRODUCTION OF AMMONIA

Daniel Pyzel, Piedmont, Calif., assignor to Shell Development Company, San Francisco, Calif., a corporation of Delaware Application February 9, 1932, Serial No. 591,853

20 Claims. (Cl. 23—199)

This invention relates to the production of ammonia by the catalytic conversion of a mixture of nitrogen and hydrogen.

It is an object of this invention to provide a process whereby the operating conditions for the catalytic converter and for the ammonia separating elements can be varied independently.

It is especially useful in the synthesis of ammonia by means of one of the modern catalysts characterized by their ability to effect high rates of conversion at comparatively low temperatures and low pressures, but also by their sensitiveness especially in regard to overheating.

Further objects and advantages will appear from the following description of my invention.

This invention is a continuation in part of my U. S. patent application Serial No. 308,511, filed September 26, 1928.

Essentially the process involves the following steps:

Contacting a hydrogen-nitrogen mixture at a certain temperature and pressure with a catalytic agent, decreasing the temperature of the ammonia rich gas stream issuing from the converter to a temperature suitable for the compression of the gas, compressing the gas to a higher pressure sufficient for the removal of the ammonia contained in the gas; further decreasing the temperature of the gas stream so that the ammonia in the stream is liquefied, removing the lean hydrogen-nitrogen gas mixture from the ammonia liquefying apparatus and expanding this gas mixture to the pressure at which the gases are passed through the catalyst.

In more detail the process involves numerous additional features. To more completely explain the various features and advantages of this invention reference is made to the accompanying drawing which shows a diagrammatic flow sheet of my process.

Mixed gas consisting of a mixture of comparatively pure nitrogen and hydrogen, for instance as obtained from low temperature fractionation apparatus or other source (not shown) is led through pipe (1) into the intake side of a suitable compressor (2). The compressed mixed gas is led through an oil separating box (3) in which lubricant carried in the gas stream from the compressor is largely removed and can be withdrawn by a valve (4) at the bottom of the box. The gas stream now enters the synthesis system. The temperature of the gas is raised to about 300° C. by passage through two heat exchangers (5) and (6) connected in series. In the event the temperature of the gas leaving the second heat exchanger (6) is not sufficiently high, the gas may be passed through an electric heater (7) by regulation of valves (8) and (9). The hot gas mixture is then led through two hydrogenation converters (10) and (11) connected in series. These converters may contain for instance finely divided nickel or cobalt.

By the catalytic effect of the contact mass traces of carbon di-oxide, carbon monoxide and oxygen in the gas stream combine with some of the hydrogen forming methane and water presumably according to the following equations:

$$CO + 3H_2 = CH_4 + H_2O$$
$$CO_2 + 4H_2 = CH_4 + 2H_2O$$
$$O_2 + 2H_2 = 2H_2O$$

The object of this conversion is to eliminate traces of carbon dioxide, carbon monoxide and oxygen in the gas stream as these gases have been found to have a harmful effect on the catalyst used to convert the hydrogen and nitrogen to ammonia. A certain minimum quantity of CO and $CO_2$ should preferably be present in the gas stream passing to the hydrogenation converters to assure activity of the catalytic mass.

The hot gas mixture issuing from the hydrogenation converters comprising nitrogen, hydrogen, traces of methane and water vapor passes through heat exchanger (5) countercurrent to the gas stream on its way to the hydrogenation converters.

From heat exchanger (5) the gas passes through a suitable cooler (12) in which the temperature is reduced sufficiently to cause condensation of the $H_2O$ in the gas stream. The water collects in the water separator (13). The mixed hydrogen and nitrogen gas containing traces of methane and water vapor as principal impurities is led into the drain box (14) through valve (15) and line (16).

The fresh gas mixture joins the circulating gas in the drain box. The ammonia rich circulating gas entering the drain box (14) has previously been compressed in the compressor (17) freed from oil and dust in oil separator (18) and cooled in the cooler (19).

It is to be noted that a feature of the process consists in the separate cooling of the fresh gas stream and removal of condensate formed during cooling before this gas is admixed with the circulating gas stream. In this manner the water formed in the hydrogenation converter is prevented from entering the rich gas stream and thus the freezing out of water in the low temperature elements is prevented. Traces of water vapor will enter the condensing elements but these are removed together with the liquid ammonia produced.

The methane formed in the hydrogenation converter has no harmful effect in the ammonia synthesis as it does not affect the activity of the catalyst. An undesirable accumulation of methane in the circulating gas stream can be avoided by occasional bleeding which can be accomplished by means of a blow-off pipe (20) controlled by a valve (21).

The mixture of fresh gas and rich circulating gas next passes through heat exchanger (22) where it is cooled by lean gas coming from the ammonia separating elements, after which the gas is finally cooled and the ammonia carried by the gas condensed in the final cooler (23). In this apparatus the gas stream passes through coils (24) which are intensely cooled by the evaporation of cold liquid ammonia surrounding the coils. The ammonia condensed from the rich gas stream is removed in the separator (25) and the collector (26) which comprise the ammonia separating elements.

In the separator (25) a major separation of the liquid ammonia from the nitrogen and hydrogen takes place, and the products of this separation discharge into the collector (26) in which a more complete separation is effected. This use of multiple separating elements facilitates the separation, and prevents too much contact of the gas with the separated liquid which allows entrainment and hinders condensation rendering the separation far less effective. It may even be advisable to provide for agitation of the separated liquid to further remove dissolved gas.

The lean gas due to its low temperature and high pressure has a very high density, which facilitates its carrying over small droplets and bubbles of liquid ammonia. A scrubbing effect of separated liquid and gas should therefore be avoided as much as possible to prevent entrainment of liquid ammonia by the lean gas.

Part or all of the liquid ammonia accumulating in the lower part of the collector (26) is withdrawn by pipe (27) and after passing through a pressure reducing regulating valve (28) is discharged into the evaporation section of cooler (24). Under the reduced pressure the ammonia evaporates taking heat from the coils containing the rich gas. Gaseous ammonia flows from the evaporation section through pipe (29) controlled by a valve (30).

Liquid anhydrous ammonia can be withdrawn from the bottom of the collector (26) by means of line (31) and valve (32) and run to storage.

If all ammonia produced is withdrawn as gaseous ammonia through pipe (29) the temperature of the liquid ammonia in the final cooler (23) may drop to such a low degree that its vapor pressure becomes too low for moving the gaseous ammonia through line (29) and through the apparatus in which the gaseous ammonia is to be used. In this case the temperature of the liquid ammonia can be increased by reducing the cooling effect of cooler (19).

By the above means, the temperature attained in the condensing elements can easily be controlled and thus the percentage of NH3 left in the gas returning to the converter regulated.

The cold lean gas leaving the top of the collector (26) by pipe (33) is passed through heat exchanger (22) and in so doing cools the rich gas passing to the cooler (23) after which the lean gas is led through pressure reducing apparatus. The reduction in pressure may be accomplished by means of a hand operated valve (34) or by a suitable automatic expansion device (35). Use of one or other of the pressure reducers shown is effected by manipulation of valves (34), (36) and (37) as will be apparent from the drawing. The pressure reducing apparatus may also be located in line (33).

Should it be desired to regain part of the energy of compression this can be done by the use of an expansion engine. If it is desired to utilize the cooling effect which could be produced in an expansion engine or similar device this should be located in line (33) rather than in lieu of the expansion valves shown at (34) and (35). If energy is caused to be liberated by the expanding lean gas a reduction in temperature of the expanded gas will result. Thus, by placing in line (33) a pressure reducing device performing work more intense cooling of the rich gas in heat exchanger (22) may be effected.

A safety valve (38) with blow off pipe (39) is connected in the line after the pressure reducers shown to prevent undue overloading of the ammonia converter and heat exchangers.

The lean gas after being reduced in pressure passes through two heat exchangers (40) and (41) connected in series, and is considerably heated.

By-pass lines (42) and (43) controlled by valves (44) and (45) may be used to regulate the heating of the nitrogen-hydrogen gas. By means of these by-pass lines and valves 44, 45, 46, 47, 48 and 49 both heat exchangers can be selectively by-passed completely or partially, as will be readily apparent from the drawing.

In this manner the temperature of the catalytic converter can be effectively controlled. An electric heater (50) is provided and is normally only used for starting up the process. The gas on its way to the converter can be passed through the electric heater (50) by suitable regulation of valves (51) and (52).

The mixed hydrogen and nitrogen gas at the desired high temperature and pressure passes into the ammonia converter (53) by pipe (54). In this converter the gases contact with a suitable catalyst forming ammonia gas.

The amount of ammonia in the gases leaving the converter may vary from 5 to 14 per cent by volume. A part of the hot stream of rich gas leaving the catalyst mass passes from the converter (53) by pipe (55) controlled by valve (56) and passes in heat exchange relationship in exchanger (6) with fresh impure gas passing to the hydrogenation converters (10) and (11).

The other part of the hot rich gas leaves the converter by pipe (57) controlled by valve (58) and passes through heat exchanger (41) thereby heating the lean gas on its way to the converter. After thus giving up part of their heat the two rich gas streams unite and pass through heat exchanger (40) giving up more heat to the lean gas. The cooled rich gas is next passed through a cooler (59) to further reduce its temperature and condense any water vapor present, after which this gas is passed through a collector (60) where any dust, water, et cetera in the stream may be deposited and periodically removed by means of a drain valve (61).

The cleaned rich gas leaves the collector by pipe (62) and is compressed to a considerably higher pressure by means of a suitable compressor, (17). Thereafter the rich gas is passed through an oil separator (18) in which any oil carried along from the compressor is removed and drained off. After passing through cooler (19) the rich gas enters the drain box (14) where it mixes with fresh purified nitrogen and hydrogen gas, continuously introduced to replace the ammonia manufactured and withdrawn from the system.

Should a mixture of nitrogen and hydrogen of a high degree of purity be available then this fresh make-up gas can be introduced into the circulating stream through line (63) by opening valve (64) and closing valve (15) as will be readily apparent from the diagram.

In an installation built to operate according to my process it is possible to pass the lean gas through the ammonia converter at about 100 atmospheres pressure and after heat exchange and cooling raise the pressure on the rich gas in a compressor capable of increasing the pressure on the rich gas to a maximum of double the pressure prevailing in the converter. The fresh make-up gas joins the circulating stream at the higher pressure. After passage through the various coolers the ammonia can be condensed from the rich gas at a temperature of about −25° C. to −30° C.

There are numerous advantages of my ammonia synthesis process heretofore unobtainable.

By the use of a different pressure on the rich gas after passage through the heat exchangers I am able to separately regulate the pressure of synthesis without adversely affecting the ammonia condensation. Previously a variation of the pressure on the ammonia catalyst had an effect on the whole system. A reduction of pressure on the catalyst for instance, besides slowing down the reaction also made the liquefaction of the ammonia more difficult, while on the other hand an increase of the pressure although facilitating the condensation of ammonia would cause a sensitive catalyst of the modern low temperature type to overheat and spoil. By using a considerable and adjustable pressure differential in the system optimum conditions for the ammonia conversion and for the extraction can be obtained, independent of each other, while my process also facilitates removal of water formed in the purification by hydrogenation of the fresh gas.

By the use of my process gaseous or gaseous and liquid ammonia can be produced by control of the pressure on the ammonia condensing elements. The ammonia obtained by the use of my process is of very pure quality and is especially suitable for manufacture of nitric acid by the catalytic oxidation of ammonia, being free of compounds such as urea formed by inter-action of carbonic oxides and ammonia.

In prior plants operating at low pressure for instance 80–120 atmospheres, extremely low temperatures have to be used in order to extract the ammonia from the rich gas by liquefaction, for instance at 100 atmospheres the temperature must be below −50° C. to obtain sufficient condensation. To obtain these low temperatures external refrigerating apparatus had to be used. Usually a refrigerating machine is used after the countercurrent cold exchanger (22) and the liquid ammonia in the final cooler (23) is kept under high vacuum, by means of a special vacuum pump, in order to lower its boiling point, so that it will cool the rich gas to the very low temperature mentioned (below −50° C.).

In my system no extraneous means like refrigerating machines or vacuum pumps are needed to cool the rich gases to the temperature at which, under the increased pressure, a sufficient condensation and separation of ammonia from these gases is obtained.

For example, working according to my invention I am operating successfully at a pressure of 100 to 105 atmospheres in the converter and from 160 to 170 atmospheres in the ammonia condensing system, with a lowest temperature in the final cooler of −25° C. to −30° C., corresponding to a vapor pressure of the liquid ammonia in the final cooler of 0.45 to 0.15 atmospheres above atmospheric pressure.

It should be understood that although I have mentioned a pressure of synthesis of about 100 atmospheres and a pressure of condensation of about 170 atmospheres I do not limit myself to these pressures. It may be necessary to reduce the pressure of synthesis considerably below 100 atmospheres, for instance to about 80 atmospheres, while on the other hand it may be necessary to increase the pressure of synthesis considerably above 100 atmospheres, for instance to 125 atmospheres or even higher. It may also be desirable to increase or decrease the condensation pressure in order to adjust the operation of the plant to varying conditions.

A reduced pressure on the ammonia catalyst may be advantageous if the catalyst is fresh and extremely active or if there is not sufficient fresh mixed gas available or if it is desired to decrease the production of ammonia. An increase in pressure on the ammonia catalyst may be of advantage if the catalyst is accidentally temporarily poisoned or if the catalyst becomes less active after long use or if the temperature of the catalyst becomes too low. An increase of pressure on the ammonia catalyst can also be used to increase the ammonia production.

An increase in pressure on the condensation apparatus may be utilized when part of the ammonia is removed from the apparatus as liquid anhydrous ammonia and the cooling effect available in the final cooler (23) by the evaporation of anhydrous ammonia consequently reduced, because an increase in pressure on the condensation apparatus can compensate for the cooling effect of the liquid anhydrous ammonia withdrawn.

A reduction of pressure on the ammonia condensation apparatus can be used to effect an increase of the ammonia content of the lean gas stream and thereby cause the temperature of the ammonia catalyst to be reduced.

All such manipulations are possible in my system as synthesis and condensation pressure differentials can be adjusted independently.

I claim as my invention:

1. Apparatus for the production of ammonia comprising: in combination a vessel containing a catalytic agent, a compressor, means for separating ammonia from the gas stream, means to expand the gas from which ammonia has been separated to the pressure prevailing in the vessel containing the catalytic agent, a supply pipe for adding fresh gas mixture and a pipe leading back to the vessel containing the catalytic agent.

2. Apparatus for the production of ammonia comprising: a vessel containing a catalytic agent, a heat exchanger, a compressor, a cold exchanger, means for separating ammonia from the gas stream, means to expand the gas from which ammonia has been separated to the pressure prevailing in the vessel containing the catalytic agent, a supply pipe for adding fresh gas mixture and a pipe leading back to the vessel containing the catalytic agent.

3. Apparatus for the production of ammonia comprising: in combination, a vessel containing a catalytic agent, a compressor, a cold exchanger, means for separating ammonia from the gas stream, and an expansion engine through which the lean gas is passed before entering the cold exchanger, a pipe for adding fresh gas mixture and a pipe leading back to the vessel containing the catalytic agent.

4. A process of producing ammonia which comprises passing nitrogen and hydrogen over a catalyst at a pressure of about 100 atmospheres thereafter increasing the pressure on the resultant gas stream, and removing liquid anhydrous ammonia from said gas stream at a temperature above −40° C.

5. A process of producing ammonia which comprises: passing nitrogen and hydrogen over a catalyst at a pressure of about 100 atmospheres thereafter increasing the pressure on the resultant gas stream and removing liquid anhydrous ammonia from said gas stream at a temperature of about −30° C.

6. A process of producing ammonia which comprises: passing nitrogen and hydrogen over a catalyst at a pressure under 160 atmospheres; thereafter increasing the pressure on the resultant gas stream, and removing liquid anhydrous ammonia from said gas stream at a temperature of about −25° C. to −30° C.

7. A process of producing ammonia which comprises passing nitrogen and hydrogen over a catalyst at a pressure under 140 atmospheres, thereafter increasing the pressure on the resultant gas steram and removing liquid anhydrous ammonia from said gas stream at a temperature of about −25° C. to −30° C.

8. A process of producing ammonia which comprises passing nitrogen and hydrogen over a catalyst at a pressure under 120 atmospheres thereafter increasing the pressure on the resultant gas stream and removing ammonia from said gas stream in the form of liquid anhydrous ammonia at a temperature of about −25° C. to −30° C.

9. A process of producing ammonia which comprises passing nitrogen and hydrogen over a catalyst at a pressure under 100 atmospheres thereafter increasing the pressure on the resultant gas stream and removing ammonia from said gas stream in the form of liquid anhydrous ammonia at a temperature of about −25° C. to −30° C.

10. In a process of producing ammonia by the catalytic conversion of a mixture of nitrogen and hydrogen, the steps of passing the mixture under pressure over a catalyst, subjecting the partially converted mixture of gases to a pressure substantially higher than the pressure maintained during conversion, injecting into the stream of gases at said higher pressure additional amounts of nitrogen and hydrogen.

11. In a process of producing ammonia by the catalytic conversion of a mixture of nitrogen and hydrogen the steps of passing the mixture under pressure over a catalyst, subjecting the partly converted mixture of gases to a pressure substantially higher than the pressure maintained during conversion, injecting into the stream of gases at said higher pressure additional amounts of nitrogen and hydrogen mixture, and thereafter separating the ammonia formed from the gas stream.

12. A process for producing ammonia by the catalytic conversion of a mixture of nitrogen and hydrogen comprising: passing the mixture under pressure of about 100 atmospheres over a catalyst, increasing the pressure on the partly converted mixture of gases by 50 atmospheres or more and thereafter removing ammonia from said partly converted mixture of gases in the form of liquid anhydrous ammonia.

13. A process for producing ammonia by the catalytic conversion of a mixture of nitrogen and hydrogen comprising: passing the mixture under pressure of about 100 atmospheres over a catalyst, increasing the pressure on the partly converted mixture of gases, and thereafter removing ammonia from said partly converted mixture of gases in the form of liquid anhydrous ammonia in the absence of external refrigeration.

14. A process for producing ammonia by the catalytic conversion of a mixture of nitrogen and hydrogen comprising: passing the mixture at a pressure of about 100 atmospheres over a catalyst increasing the pressure on the partly converted gas stream and thereafter removing the ammonia from said partly converted gas stream by the use of water cooling and cold exchange with media contained in the system.

15. A process for the production of ammonia by the catalytic conversion of a mixture of nitrogen and hydrogen comprising: passing an impure nitrogen hydrogen mixture over a hydrogenation catalyst at a high pressure removing the water formed in the gas stream, passing the purified nitrogen hydrogen gas into a circulating stream of gases at said high pressure thereafter reducing the pressure on said gases and then passing the mixture over an ammonia catalyst.

16. A process for the production of ammonia by the catalytic conversion of a mixture of nitrogen and hydrogen comprising: passing an impure nitrogen-hydrogen gas over a hydrogenation catalyst at a high pressure, removing the water formed in the gas, introducing the purified nitrogen hydrogen gas into a circulating stream of gases at said high pressure, passing the gas mixture thus formed through ammonia condensing apparatus and reducing the pressure on the nitrogen-hydrogen gas and passing the mixture over an ammonia catalyst, substantially as described.

17. Apparatus for the production of ammonia comprising in succession: means to pass an impure mixture of nitrogen and hydrogen gas over a hydrogenation catalyst, a water separator, an ammonia converter, a compressor means for separating ammonia from the gas stream, a pressure reducer and a pipe leading back to the ammonia converter.

18. Process for the production of ammonia comprising: passing impure nitrogen and hydrogen under pressure over a hydrogenation catalyst removing the water vapor formed, passing the gas mixture through an ammonia converter, raising the pressure of the partly converted gas mixture to a substantially higher pressure than that in the ammonia converter, and removing the ammonia from the mixture at said higher pressure.

19. The process of separating a gaseous reaction product from its gaseous constituents in a closed system comprising: producing a substantial pressure differential in said system, condensing said reaction product from its constituents at the higher pressure and thereafter returning said constituents to the lower pressure section of the system in which reaction between the constituents is effected.

20. Apparatus for the production of ammonia comprising in succession means to pass an impure mixture of nitrogen and hydrogen gas over a hydrogenation catalyst, a water separator, an ammonia converter, a compressor, means for separating ammonia from the gas stream, a pressure reducer and a pipe leading to a second ammonia converter.

DANIEL PYZEL.